(12) United States Patent
Ko et al.

(10) Patent No.: US 10,778,679 B2
(45) Date of Patent: Sep. 15, 2020

(54) SECURE SEMICONDUCTOR CHIP AND OPERATING METHOD THEREOF

(71) Applicant: INDUSTRY-UNIVERSITY COOPERATION FOUNDATION HANYANG UNIVERSITY, Seoul (KR)

(72) Inventors: Hyoung Ho Ko, Daejeon (KR); Byong Deok Choi, Seoul (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 0 days.

(21) Appl. No.: 16/076,473

(22) PCT Filed: Feb. 10, 2017

(86) PCT No.: PCT/KR2017/001491
§ 371 (c)(1),
(2) Date: Oct. 29, 2018

(87) PCT Pub. No.: WO2017/138773
PCT Pub. Date: Aug. 17, 2017

(65) Prior Publication Data
US 2019/0050702 A1    Feb. 14, 2019

(30) Foreign Application Priority Data

Feb. 12, 2016  (KR) .................. 10-2016-0016587
Feb. 10, 2017  (KR) .................. 10-2017-0018692

(51) Int. Cl.
*G11C 7/24* (2006.01)
*H04L 29/06* (2006.01)
(Continued)

(52) U.S. Cl.
CPC ...... *H04L 63/0869* (2013.01); *G06F 15/7807* (2013.01); *G06F 15/7842* (2013.01);
(Continued)

(58) Field of Classification Search
CPC .............. H04L 63/0869; H04L 19/321; H04L 19/3263; H04L 19/3278; G06F 15/7807;
(Continued)

(56) References Cited

U.S. PATENT DOCUMENTS

| 4,910,707 A * | 3/1990 | Schrenk ........... H01L 23/576 365/185.04 |
| 2002/0014576 A1* | 2/2002 | Mituhashi ........... H05B 45/50 250/205 |
| 2009/0013415 A1* | 1/2009 | Lee ..................... G06F 21/86 726/34 |

FOREIGN PATENT DOCUMENTS

| KR | 10-0252563 B1 | 4/2000 |
| KR | 10-2004-0049117 A | 6/2004 |

(Continued)

*Primary Examiner* — Alfredo Bermudez Lozada (57) ABSTRACT

A semiconductor chip comprises at least one data bus to transmit data processed by the semiconductor chip, an electric potential generator block packaged together with the at least one data bus to be blocked from external light by a package, the electric potential generator block to detect an event in which the package is unable to block the external light, and a switch configured to block a transmission of at least some data in the at least one data bus if the event is detected. A semiconductor chip comprises an energy harvesting element inside a package. The energy harvesting element may comprise an on-chip photodiode. A depackaging attack causes the generation of a voltage of a photodiode, and thus a change in physical state of the packaging can be detected.

11 Claims, 7 Drawing Sheets

(51) Int. Cl.
*G06F 15/78* (2006.01)
*G06F 21/60* (2013.01)
*G06F 21/57* (2013.01)
*G06F 21/55* (2013.01)
*G06K 19/073* (2006.01)
*G06Q 20/34* (2012.01)
*G06F 21/74* (2013.01)
*G06F 21/85* (2013.01)
*H04L 9/32* (2006.01)

(52) U.S. Cl.
CPC .......... *G06F 15/7853* (2013.01); *G06F 21/55* (2013.01); *G06F 21/556* (2013.01); *G06F 21/57* (2013.01); *G06F 21/60* (2013.01); *G06F 21/602* (2013.01); *G06F 21/74* (2013.01); *G06F 21/85* (2013.01); *G06K 19/07372* (2013.01); *G06Q 20/341* (2013.01); *H04L 9/321* (2013.01); *H04L 9/3263* (2013.01); *H04L 9/3278* (2013.01); *G06F 2221/2149* (2013.01); *H04L 2209/12* (2013.01)

(58) Field of Classification Search
CPC .. G06F 15/7842; G06F 15/7852; G06F 21/55; G06F 21/57; G06F 21/60; G06F 21/602; G06F 21/74; G06F 21/85; G06F 2211/007; G06F 12/00; G06K 19/07372; G06Q 20/341; G11C 5/00; G11C 11/4125; G11C 11/41355; G11C 11/1695; G11C 11/2295; G11C 11/4078; G11C 7/24; G11C 8/20; G11C 29/52; G11C 16/22; G11C 13/0059
See application file for complete search history.

(56) References Cited

FOREIGN PATENT DOCUMENTS

KR  10-2005-0066558 A  6/2005
KR  10-2008-0112803 A  12/2008

\* cited by examiner

SECURE SEMICONDUCTOR CHIP AND OPERATING METHOD THEREOF

CROSS-REFERENCE TO RELATED APPLICATIONS

This application is a National Stage Entry of PCT International Application No. PCT/KR2017/001491, which was filed on Feb. 10, 2017, and which claims priority from Korean Patent Application No. 10-2016-0016587 filed with the Korean Intellectual Property Office on Feb. 12, 2016, and Korean Patent Application No. 10-2017-0018692 filed with the Korean Intellectual Property Office on Feb. 10, 2017. The disclosures of the above patent applications are incorporated herein by reference in their entirety.

BACKGROUND

1. Technical Field

The present invention relates to a semiconductor chip having increased security and a method for operating the same, more particularly to the detection of physical attacks against the semiconductor chip.

2. Description of the Related Art

Various physical attacks and software attacks on semiconductor chips pose a threat against products using SoC (system-on-chip) technology and application services based on such products. There are various known examples of physical attacks, such as depackaging, circuit deformation using a FIB (focused ion beam), micro-probing, power analysis, EMA (electromagnetic analysis), fault injection using voltage, frequency, or temperature alterations, etc.

Techniques for detecting physical attacks and protecting the circuit have been introduced, and the prior art documents provided below, for example, allow an understanding of previous attempts.

The technological document "A Highly time sensitive XOR gate for probe attempt detectors" (S. Manich, et al., IEEE Trans. Circuits Syst., II: Exp. Briefs, vol. 60, no. 11, pp. 786-790, November 2013) presents a technique of detecting a probing capacitance delay, which occurs when a semiconductor chip is depackaged and the data bus within is probed.

SUMMARY OF THE INVENTION

An aspect of the invention is to provide a secure semiconductor chip and an operating method therefor, where the secure semiconductor chip can detect physical attacks and perform a countermeasure when an attack is detected.

One aspect of the invention provides a semiconductor chip that includes: at least one data bus, which is configured to transmit data processed by the semiconductor chip; an electric potential generator block, which is packaged together with the at least one data bus to be blocked from external light by a package, and which is configured to detect an event of the package being unable to block the external light; and a switch, which is configured to cut off the transmission of at least some data in the at least one data bus if such an event is detected.

In an embodiment of the invention, the electric potential generator block may include an energy harvesting element that generates energy by using the light when exposed to the external light.

In an embodiment of the invention, the electric potential generator block may include: at least one photodiode configured to generate a current when exposed to the external light; a capacitor configured to store an electric charge caused by at least a portion of the current; and a pull-down resistor configured to discharge the electric charge from the capacitor.

In an embodiment of the invention, the switch may be turned on by a potential difference occurring at both ends of the pull-down resistor, during a discharge of the electric charge by way of the pull-down resistor, to discharge at least some data from the at least one data bus to the ground and thereby cut off the transmission.

In an embodiment of the invention, the pull-down resistor may include an active element having a resistance value that is programmable by a setting.

In an embodiment of the invention, increasing a setting of the pull-down resistor may decrease the amount of discharged current required for turning on the switch such that the switch is turned on relatively easily, and decreasing a setting of the pull-down resistor may increase the amount of discharged current required for turning on the switch such that the switch is turned on relatively difficultly.

In an embodiment of the invention, the at least one photodiode may include a multiple number of photodiodes cascaded in at least a portion thereof.

In an embodiment of the invention, the at least one photodiode may include a multiple number of photodiodes connected hierarchically in a tree structure.

In an embodiment of the invention, the at least one data bus may include a multiple number of data buses configured to transmit data in parallel, and the multiple data buses may share the electric potential generator block.

Another aspect of the invention provides a protection device that is to be embedded in a semiconductor chip packaging, where the protection device includes: an electric potential generator block configured to detect an event in which the package is unable to block external light; and a switch configured to cut off at least a portion of data transmission paths within the semiconductor chip if such an event is detected.

In an embodiment of the invention, the electric potential generator block may include: at least one photodiode configured to generate a current when exposed to the external light; a capacitor configured to store an electric charge caused by at least a portion of the current; and a pull-down resistor configured to discharge the electric charge from the capacitor.

In an embodiment of the invention, the switch may be turned on by a potential difference occurring at both ends of the pull-down resistor, during a discharge of the electric charge by way of the pull-down resistor, to ground at least a portion of the transmission paths and thereby cut off the transmission paths.

In an embodiment of the invention, the pull-down resistor may include an active element having a resistance value that is programmable by a setting.

In an embodiment of the invention, increasing a setting of the pull-down resistor may decrease the amount of discharged current required for turning on the switch such that the switch is turned on relatively easily, and decreasing a setting of the pull-down resistor may increase the amount of discharged current required for turning on the switch such that the switch is turned on relatively difficultly.

In an embodiment of the invention, the at least one photodiode may include a multiple number of photodiodes connected hierarchically in a tree structure.

Yet another aspect of the invention provides a method of detecting a damage to a packaging as performed by a semiconductor chip, where the method includes: generating a potential difference at both ends of a pull-down resistor when light infiltrates from outside the packaging of the semiconductor chip due to the damage to the packaging, the generating performed by an electric potential generator block embedded in a form of an on-chip module; and cutting off data transmission by grounding at least a portion of data transmission paths within the semiconductor chip by way of the potential difference.

The present invention makes it possible to detect physical attacks and perform a countermeasure when an attack is detected.

DETAILED DESCRIPTION OF THE INVENTION

Certain embodiments of the invention will be described below in more detail with reference to the accompanying drawings. However, the scope of rights is not constrained by or limited to such embodiments. In the drawings, the same reference numerals represent the same components.

While the terms used in the descriptions below are those that are typically and commonly used in the relevant field of technology, different terms can be used under different circumstances due to technological advances and/or changes, traditions, preferences of technicians, etc. Thus, the terms used in the descriptions below must not be understood to be limiting the technical spirit and are to be understood as illustrative terms.

Furthermore, in certain cases, some of the terms used were arbitrarily chosen by the applicant, and in such cases, the detailed meanings of the terms may be disclosed in the corresponding descriptions. Thus, the terms used in the descriptions below should be understood not only by how the terms are named but by the meanings conveyed by the terms as well as the context of the overall specification.

While such terms as "first" and "second", etc., can be used to describe various elements, such elements are to be interpreted only as distinguishing one element from another. For example, a first element can be referred to as a second element, and similarly a second element can be referred to as a first element.

When an element is mentioned as being "connected" to another element, it should be understood that the element can be directly connected or joined to the other element but can also have yet another element interposed therebetween.

An expression used in the singular encompasses the expression of the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

As mentioned above, various physical attacks and software attacks on a semiconductor chip can pose a threat to the security or stability of the semiconductor chip. In particular, if the data bus within the semiconductor chip is accessed via a depackaging of the semiconductor chip, data can be exposed to hacking, etc., and as such, it is desirable to provide a structure that can fundamentally block the leakage of data in such cases.

Generally, when depackaging occurs, light from outside the packaging of the semiconductor chip infiltrates the inside of the packaging. Although it is possible that the depackaging itself does not cause light to enter in special cases, for example when the depackaging occurs under limited circumstances such as in a darkroom, etc., there would still be photons detected during the process of accessing the data bus or observing the structure inside the chip.

Thus, a structure is proposed that uses a photosensitive element to detect, and if necessary counter, an anomaly under circumstances in which light infiltrates the interior of the semiconductor chip due to the occurrence of a depackaging attack or some other abnormal situation. For example, the semiconductor chip may include an energy harvesting element within the package. In one example, the energy harvesting element can include an on-chip photodiode. Since a depackaging attack would cause the photodiode to generate a voltage, it would be possible to detect light infiltrating the interior of the packaging. As an energy harvesting technique is used, it is still possible for the energy harvester to accumulate light energy from the ambient light and operate a protection trigger signal if the package is removed or damaged, even when there is no power supplied to the chip. A more detailed description of various embodiments is provided below with reference to the drawings.

Figure 1:
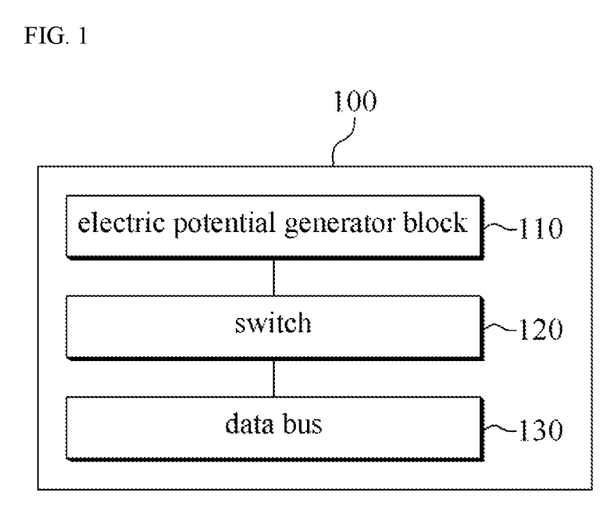
FIG. 1 is a block diagram for describing a secure semiconductor chip according to an embodiment of the invention.

FIG. 1 is a block diagram for describing a secure semiconductor chip according to an embodiment of the invention. In an embodiment of the invention, a secure semiconductor chip 100 can include an electric potential generator block 110, a switch 120, and a data bus 130. The secure semiconductor chip 100 can detect an anomaly such as a depackaging attack, etc., by a method of collecting light energy as described above.

In an embodiment of the invention, the electric potential generator block 110 can employ a structure for collecting light energy to be configured to create a potential difference when light energy greater than or equal to a particular amount is collected. For example, the electric potential generator block 110 can collect light energy that has penetrated into the interior of the packaging by using an energy harvesting element or a photodiode, etc., and use at least a portion of the collected light energy to create a potential difference by way of a capacitor and a pull-down resistor.

More specifically, the electric potential generator block 110 can include at least one photodiode that generates an electric current when exposed to external light, a capacitor that stores an electric charge resulting from at least a portion of the current, and a pull-down resistor that causes the electric charge to be discharged from the capacitor.

In an embodiment of the invention, the switch 120 can cut off the data output of the data bus 130 of the semiconductor chip by using the potential difference generated by the capacitor and the pull-down resistor. For example, the switch 120 can be turned off, if there is no light energy collected, to enable the data output of the data bus 130 to proceed as normal, but if an anomaly such as a depackaging, etc., is detected by way of the light energy collected by the electric potential generator block 110, the switch 120 can cut off the data output of the data bus 130 so that the data output does not proceed as normal.

According to an embodiment of the invention, in cases where the secure semiconductor chip 100 includes a multiple number of data buses 130, the setup can be configured such that one electric potential generator block 110 is shared by multiple data buses 130. For example, a structure can be selected in which the electric potential generator block 110 is connected to a multiple number of switches 120 that correspond respectively to a multiple number of data buses 130.

Figure 2:
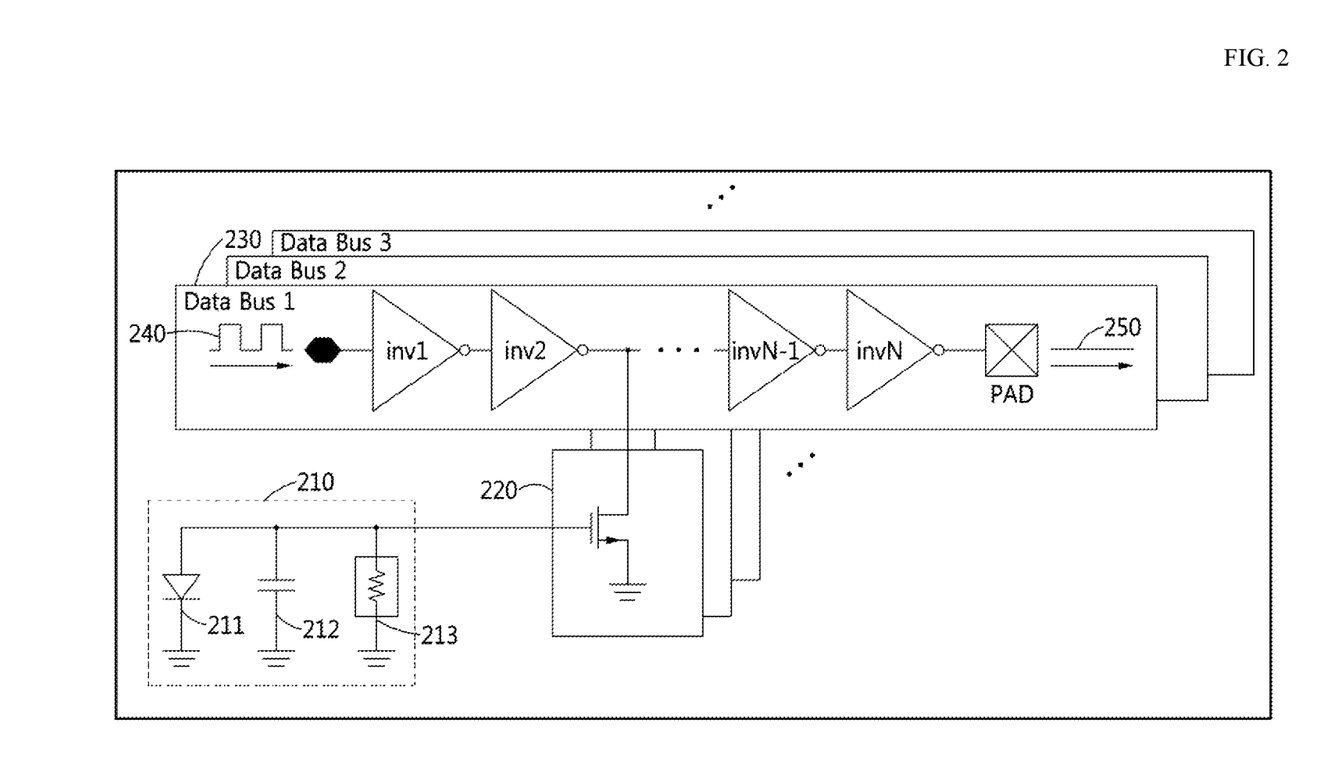
FIG. 2 is a diagram conceptually illustrating a portion of a secure semiconductor chip according to an embodiment of the invention.

FIG. 2 is a diagram conceptually illustrating a portion of a secure semiconductor chip according to an embodiment of the invention. In an embodiment of the invention, the secure semiconductor chip can include an electric potential generator block 210, a switch 220, and data buses 230.

In an embodiment of the invention, the electric potential generator block 210 can include a photodiode 211, a capacitor 212, and a pull-down resistor 213. For example, if the photodiode 211 is exposed to external light and generates a current, an electric charge may be stored in the capacitor 212 using the generated current. When the voltage of the upper node of the capacitor 212 is raised by the storage of the electric charge, a discharge current may be generated by the pull-down resistor 213 from the voltage difference between the upper node of the capacitor 212 and the ground.

Here, if the voltage at the upper node of the capacitor 212 increases to or above a threshold voltage, it can be determined that an anomaly such as depackaging, etc., has occurred in the semiconductor chip, and a protection circuit for the semiconductor chip can be operated by way of the switch 220, etc. For example, if the current generated at the photodiode 211 is greater than the current discharged through the pull-down resistor 213, the voltage at the upper node of the capacitor 212 would gradually increase, and when the voltage at the upper node of the capacitor 212 becomes greater than or equal to the threshold voltage, the protective countermeasure for the semiconductor chip can be performed.

In the embodiment presented here, an example of a protective countermeasure for the semiconductor chip is disclosed, where the switch 220 may cut off the data output of the data buses 230 to prevent a normal data output. If the voltage at the upper node of the capacitor 212 is increased such that the switch 220 is turned on, then, for example, the output of a second inverter (inv2) can be forcibly made low, so that the output of the data buses 230 may all be low. By cutting off the PAD output of the internal data in this manner such that the data input 240 of the data buses 230 is not transferred to the data output 250, it is possible to prevent the data output from being leaked by an external attack.

However, cutting off the data transmission path as described above is merely one of various embodiments for a countermeasure that can be performed in the event of the package being removed or damaged, and there can be other examples for countermeasures involving a protection circuit employing light energy harvesting to alter the electrical state of the circuits from before a package removal or damage is incurred on the semiconductor chip. For instance, other embodiments for a protective countermeasure for the semiconductor chip can entail erasing data, scrambling data, destroying or deactivating the semiconductor chip, etc. Thus, the countermeasures are not be interpreted as being limited to the examples explicitly described herein.

If the potential difference, created by the current generated at the photodiode 211 flowing through the pull-down resistor 213, is smaller than a threshold of a particular level (where the threshold can be associated with the turn-on threshold of a transistor switch), the protective circuit may not operate. If the electric charge generated by the energy harvesting is so small as to be unable to create a sufficient potential difference at both ends of the capacitor 212, then it can be determined that an anomaly such as depackaging, etc., has not occurred in the semiconductor chip, and as such, the protective circuit may not be operated. This operational threshold is associated with the sensitivity of the circuit as regards how sensitive the circuit is in triggering the protective countermeasure. The sensitivity can be set appropriately to prevent the protective circuit from being triggered unnecessarily, such as by a dark current, which can occur temporarily during a normal course of operation of the semiconductor chip, or by X rays, etc., which radiate from outside the semiconductor packaging and penetrate through the package.

In an embodiment of the invention, the pull-down resistor 213 may be configured to be capable of adjusting the point at which the protective circuit begins to operate according to the intensity of the light sensed. For example, if the resistance value of the pull-down resistor 213 is increased, then the discharge current would decrease, and therefore the cutting off of data output by the switch 220 can be performed even though the current generated at the photodiode 211 is relatively small. Conversely, if the resistance value of the pull-down resistor 213 is decreased, then the discharge current would increase, and therefore the cutting off of data output by the switch 220 can be performed when the current generated at the photodiode 211 is relatively large.

That is, by implementing the pull-down resistor 213 as a programmable component to control the magnitude of the discharge current, it is possible to adjust the magnitude of the generated current at which the protective circuit begins to operate. The size of the resistance value of the pull-down resistor 213 can be designed to be an appropriate value based on the properties of the semiconductor chip, the type of packaging, the environment in which the semiconductor chip is used, etc., and can be implemented to be programmable.

According to an embodiment of the invention, in cases where the secure semiconductor chip includes a multiple number of data buses 230, the setup can be configured such that one electric potential generator block 210 is shared by multiple data buses 230. For example, a structure can be selected in which the electric potential generator block 210 is connected to a multiple number of switches 220 that correspond respectively to a multiple number of data buses 230.

Figure 3:
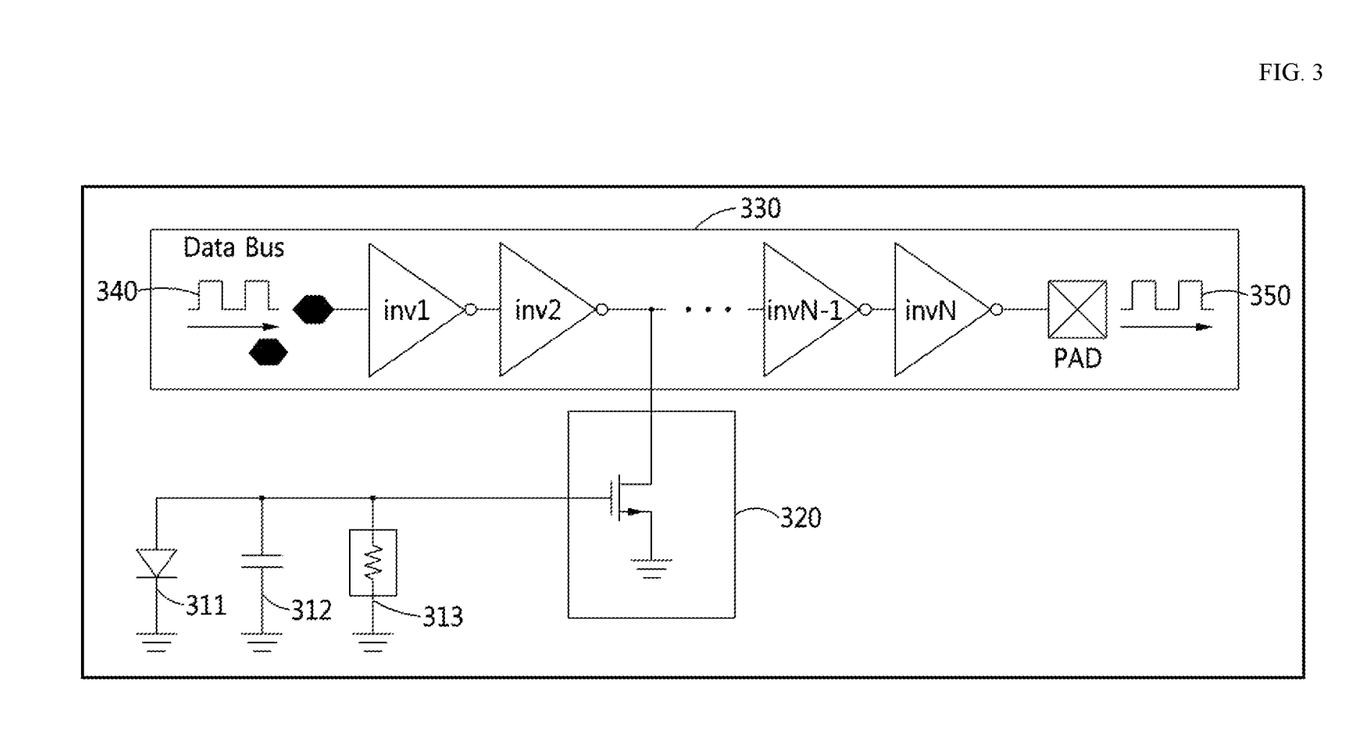
FIG. 3 is an example diagram for describing the operation of a secure semiconductor chip according to an embodiment of the invention.

FIG. 3 is an example diagram for describing the operation of a secure semiconductor chip according to an embodiment of the invention. The secure semiconductor chip in FIG. 3 can, for example, be a part of the secure semiconductor chip illustrated in FIG. 2. In an embodiment of the invention, the secure semiconductor chip can include a photodiode 311, a capacitor 312, a pull-down resistor 313, a switch 320, and a data bus 330.

FIG. 3 illustrates an example of the operation of the secure semiconductor chip before the occurrence of a security attack such as depackaging, etc. In a normal environment where the packaging has not been damaged, both ends of the photodiode 311 may be in a state substantially the same as being open, so that the voltage at the upper node of the capacitor 312 may be kept at a value close to the ground. As described above, even if a small current occurs temporarily, the discharging structure using the pull-down resistor 313 can keep the voltage of the upper node of the capacitor 312 at a value close to the ground.

That is, the setup may be designed such that, before a security attack such as depackaging occurs, the current generated at the photodiode 211 is smaller than the current discharged by way of the pull-down resistor 213, with the result that the voltage of the upper node of the capacitor 312 and the gate terminal of the switch 320 may be kept at a value close to the ground.

Consequently, since the switch 320 may be kept in an off state, the pulse train provided at the data input 340 of the data bus 330 can be transferred as normal to the PAD data output 350 of internal data.

Figure 4:
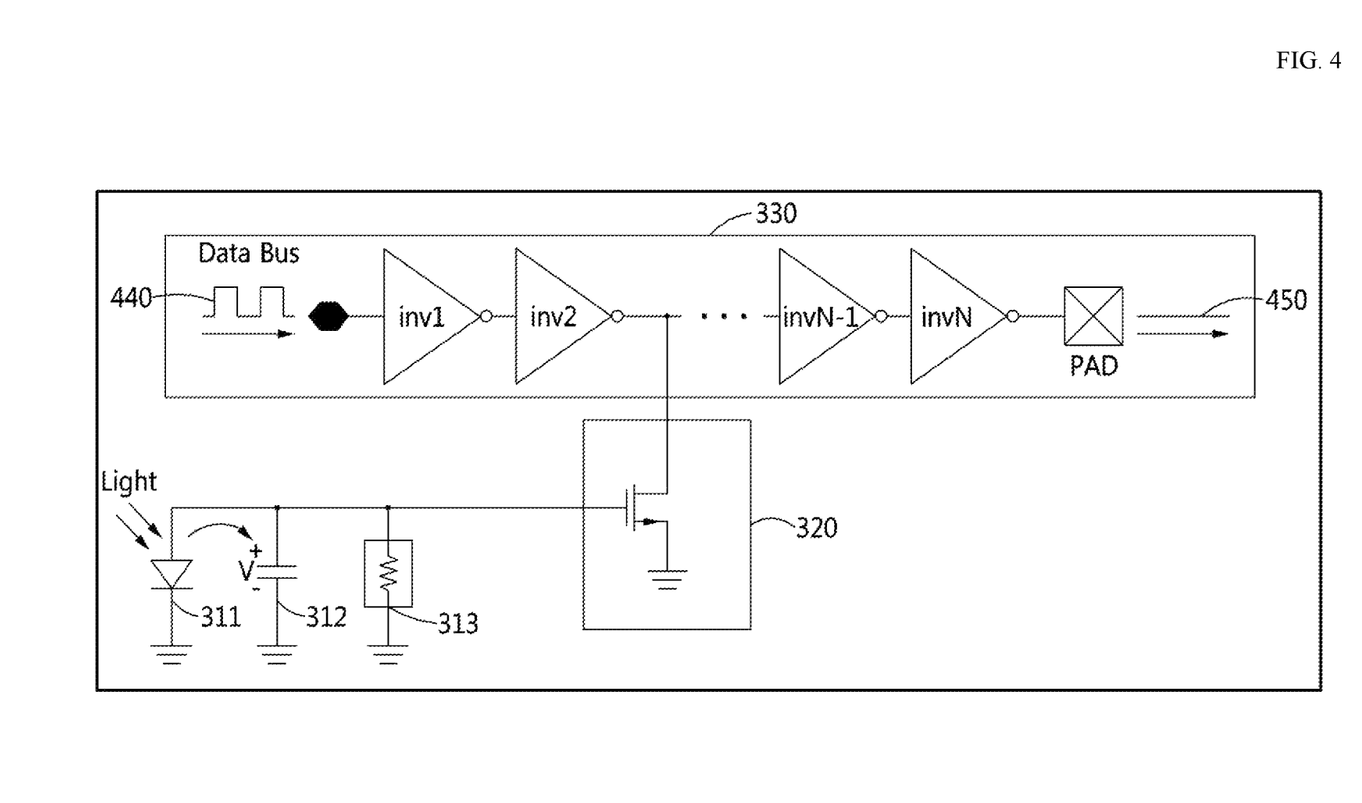
FIG. 4 is an example diagram for describing the operation of a secure semiconductor chip according to an embodiment of the invention.

FIG. 4 is an example diagram for describing the operation of a secure semiconductor chip according to an embodiment of the invention. The secure semiconductor chip in FIG. 4 can, for example, be a part of the secure semiconductor chip illustrated in FIG. 2. In an embodiment of the invention, the secure semiconductor chip can include a photodiode 311, a capacitor 312, a pull-down resistor 313, a switch 320, and a data bus 330, in the same arrangement as that described for FIG. 3.

FIG. 4 illustrates an example of the operation of the secure semiconductor chip after the occurrence of a security attack such as depackaging, etc. In an environment where the packaging has been damaged and light has infiltrated into the interior of the packaging, the photodiode 311 is able to sense the light energy, and the current generated by the photodiode 311 may cause the voltage at the upper node of the capacitor 312 to gradually increase.

That is, the setup may be designed such that, if a security attack such as depackaging has occurred, the current generated at the photodiode 211 is greater than the current discharged by way of the pull-down resistor 213, with the result that the voltage of the upper node of the capacitor 312 and the gate terminal of the switch 320 may be gradually increased.

When the voltage of the upper node of the capacitor 312 and the gate terminal of the switch 320 becomes greater than or equal to a threshold voltage, it can be determined that an anomaly such as a depackaging, etc., has occurred in the semiconductor chip, and the data output of the data bus 330 can be cut off by way of the switch 320 such that the data output does not proceed as normal. That is, if the switch 320 is turned on, then, for example, the output of the second inverter (inv2) can be forcibly made low, so that the output of the data bus 330 may all be low. By cutting off the PAD output of the internal data in this manner such that the data input 440 of the data bus 330 is not transferred to the data output 450, it is possible to prevent the data output from being leaked by an external attack.

Figure 5:
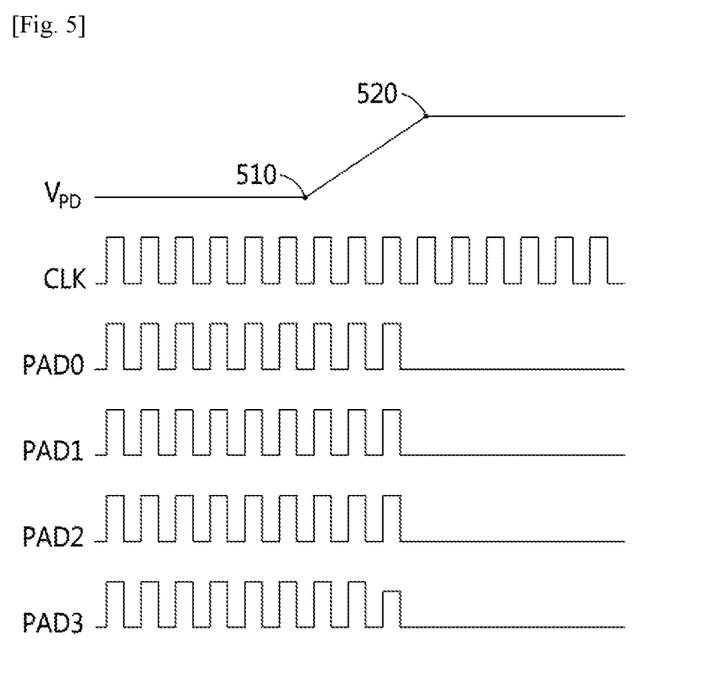
FIG. 5 is a timing diagram for describing a method by which a semiconductor chip according to an embodiment of the invention may detect damage to the packaging.

FIG. 5 is a timing diagram for describing a method by which a semiconductor chip according to an embodiment of the invention may detect damage to the packaging.

As an example, the PAD outputs (PAD0, PAD1, PAD2, PAD3) of four data buses are illustrated. $V_{PD}$ represents the voltage formed at the upper node of the capacitor using the current generated by the photodiode, and CLK represents a clock signal.

Looking at the trend of $V_{PD}$ in the example illustrated in FIG. 5, $V_{PD}$ begins to rise at a first point 510, which is when the photodiode begins to generate a current due to a depackaging attack, and the voltage continues to rise for a period of time until the rise in $V_{PD}$ stops at a second point 520, which is when the current generated at the photodiode becomes equal to the current discharged by way of the pull-down resistor.

Here, the threshold voltage can be selected as the difference between the $V_{PD}$ value for the first point 510 and the $V_{PD}$ value for the second point 520. That is, the switch for cutting off the output of the data bus can be made to turn on based on the threshold voltage. When the cutoff switch is turned on, the output of the data buses can all be forcibly made low, as already described above. In the illustrated example, it can be seen that, due to the operation of the cutoff switch, the PAD outputs (PAD0, PAD1, PAD2, PAD3) of the four data buses do not output normal data but output only a low signal from a particular point onward. In this manner, the leakage of internal data can be fundamentally blocked.

Figure 6:
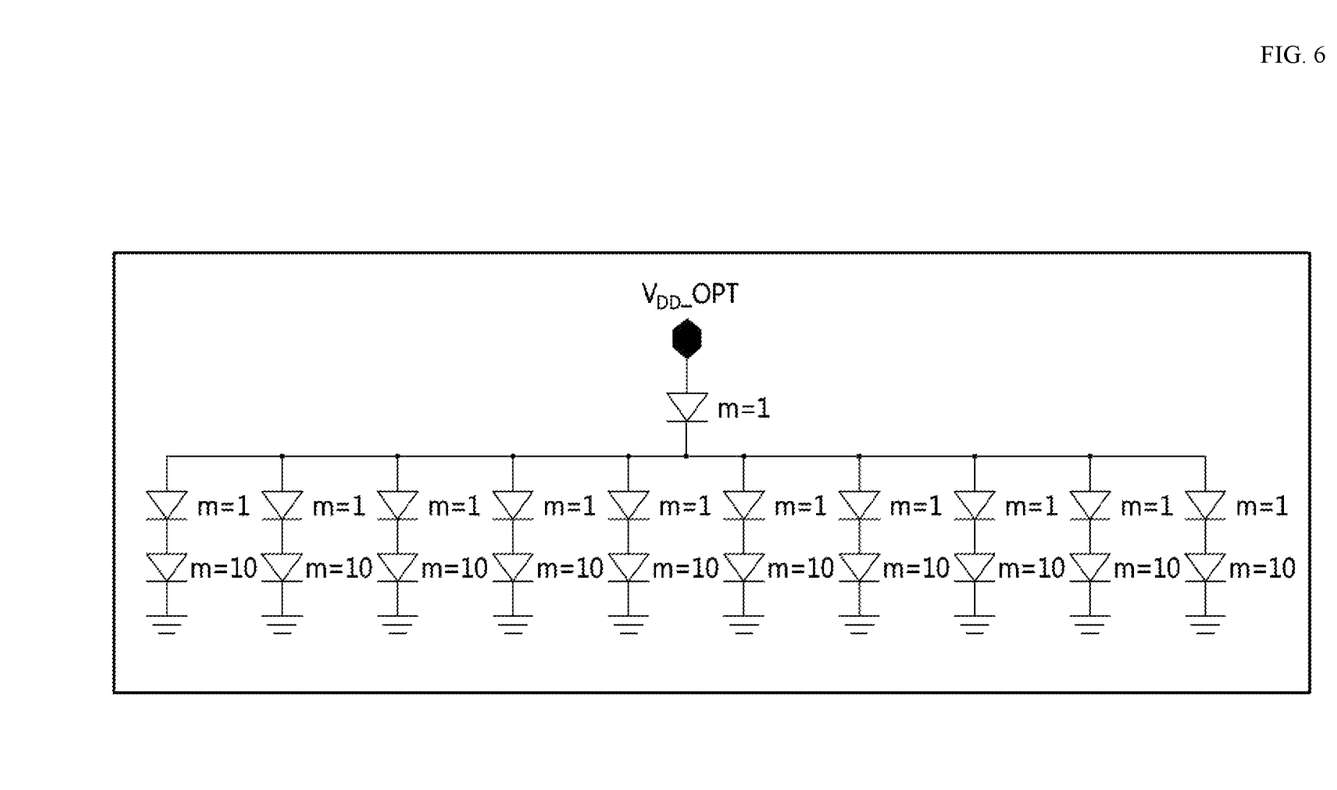
FIG. 6 is a diagram illustrating an example of an on-chip photodiode of a security device in a semiconductor chip according to an embodiment of the invention.

FIG. 6 is a diagram illustrating an example of an on-chip photodiode of a security device in a semiconductor chip according to an embodiment of the invention. The on-chip photodiode of FIG. 6 can be used, for example, in implementing the electric potential generator block 110 of the secure semiconductor chip 100 in FIG. 1.

As in the illustration, an on-chip photodiode according to an embodiment of the invention can include multiple photodiodes cascaded in a tree structure in order to readily generate a high voltage required for operating the circuit. When light energy that has infiltrated into the interior of the packaging is collected by way of this structure, at least a portion of the collected light energy can be transferred to the capacitor to generate a potential difference. Adopting an on-chip photodiode having such a tree structure may provide the advantage that the voltage required for operating the circuit can be generated even without a DC-DC converter.

The photodiode can be substituted by or be used in conjunction with an arbitrary element capable of performing the same or a similar function. Also, in addition to the structure explicitly illustrated in FIG. 6, other structures that adapt or modify the structure can be used as appropriate for the corresponding embodiment.

As described above, when the current generated at the on-chip photodiode is greater than the current discharged by way of the pull-down resistor, the voltage may increase at the upper node of the capacitor, causing the cutoff switch to be turned on. Therefore, the photosensitivity performance and specific design of the on-chip photodiode can be optimized in consideration of the properties of the pull-down resistor and the cutoff switch.

Figure 7:
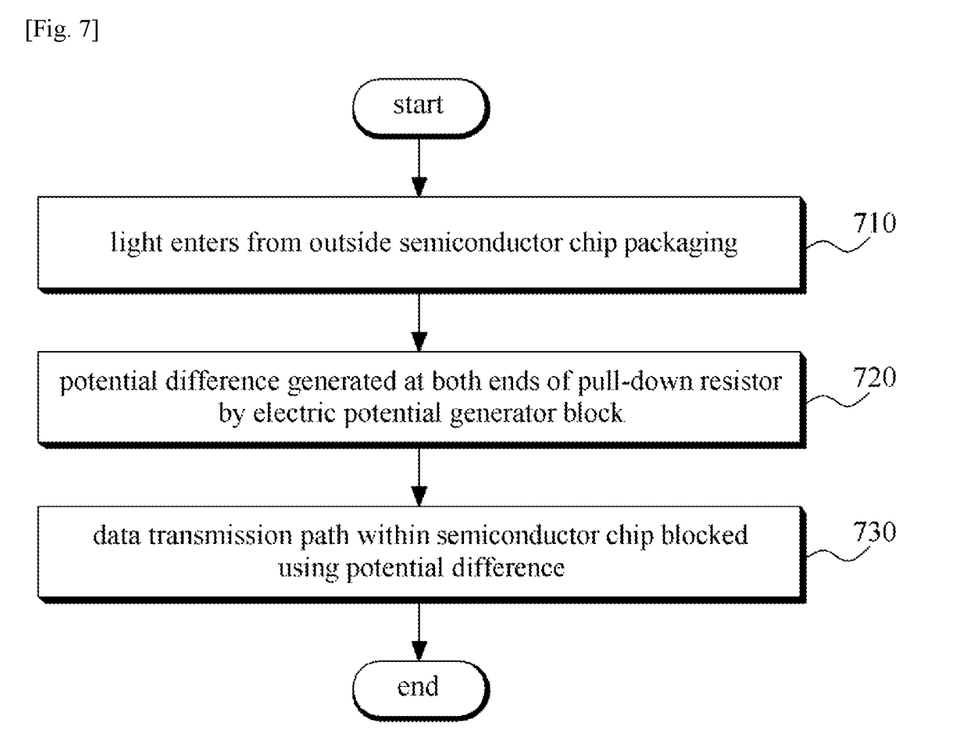
FIG. 7 is a flow diagram illustrating a method by which a semiconductor chip according to an embodiment of the invention may detect damage to the packaging.

FIG. 7 is a flow diagram illustrating a method by which a semiconductor chip according to an embodiment of the invention may detect damage to the packaging. For example, the method of FIG. 7 can be practiced as a method of operating the secure semiconductor chip 100 of FIG. 1.

In step 710, light can enter from outside the packaging of the semiconductor. Since such infiltration of light means that the packaging of the semiconductor chip has been damaged by a depackaging attack or some other abnormal circumstance, it is desirable to perform a countermeasure to fundamentally block hacking attempts, etc., which may occur after a depackaging of the semiconductor chip.

As mentioned above, although it is possible that the depackaging itself does not cause light to enter, for example when the depackaging occurs under limited circumstances such as in a darkroom, there would still be photons detected during the process of accessing the data bus or observing the internal structure of the chip.

In step 720, an electric potential generator block can be used to generate a potential difference at both ends of a pull-down resistor. That is, since it has been determined from the infiltration of light in step 710 that a security attack such as depackaging, etc., has occurred, the electric potential generator block can generate a potential difference for activating the protective circuit.

For example, the setup can be designed such that the current generated at the photodiode is greater than the current discharged by way of the pull-down resistor, with the result that the voltage at the upper node of the capacitor and the gate terminal of the cutoff switch may gradually increase.

In step 730, the potential difference can be used to cut off the data transmission path within the semiconductor chip. For example, the PAD output of each data bus can be forcibly made low, so that normal data outputs may not be transferred. Also, another protective measure for the semiconductor chip, such as erasing data, scrambling data, or destroying or deactivating the semiconductor chip, can be applied as necessary either additionally or alternatively. As mentioned above, while certain embodiments have been described herein with mention of cutting off the data output of the data bus in relation to a method of operating a protective circuit, it is to be appreciated that the protective measures for the semiconductor chip are not limited only to the examples explicitly described herein.

According to the embodiments described above, if the package of a chip is damaged or removed, an energy harvesting element such as a photodiode, for example, may harvest the ambient light energy to operate a trigger circuit for initializing or erasing security data, etc. The illuminance in a typical indoor space and the reactivity to light of the P-N junction of a CMOS are $0.5$ $W/m^2$ and $0.5$ $A \cdot cm^{-2}/W \cdot cm^{-2}$, respectively. Assuming an example environment, a photodiode having an area of $100$ $um^2$ can generate a photoelectric current of $2.5$ nA. Supposing a capacitor of $10$ pF with a supply voltage of $1.8V$, the time required for operating the protective circuit is approximately $72$ ms. When the capacitor is fully charged, a current of $18$ uA is supplied for $10$ us to report to the trigger circuit. With such harvesting of light energy, it is possible to perform a protective operation such as deleting the content of the SRAM in a very short amount of time (for instance, less than $0.1$ seconds). Thus, physical attacks such as removing at least a portion of the package or invasive micro-probing can be effectively deterred by the embodiments described above.

The device described above can be implemented as one or more hardware components for a memory, one or more software components for controlling the memory, and/or one or more combinations of hardware components and software components. For example, the device and components in the embodiments described above can be implemented by using one or more general purpose computer or special purpose computer, which may include, for example, a processor, a controller, an ALU (arithmetic logic unit), a digital signal processor, a microcomputer, a FPA (field programmable array), a PLU (programmable logic unit), a microprocessor, or any other device capable of executing and responding to instructions.

The software can include a computer program, code, instructions, or a combination of one or more of the above to configure a processing device to operate as desired or command a processing device independently or collectively. The software and/or data can be permanently or temporarily embodied as a type of machinery, component, physical device, virtual equipment, computer storage medium or device, or transmitted signal wave to be interpreted by a processing device or to provide instructions or data to a processing device. The software can also be distributed over computer systems connected over a network and can be stored or executed in a distributed manner. The software and data can be stored on one or more computer-readable recorded medium.

A method of controlling memory operation according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the embodiment or can be a type known to and used by the skilled person in the field of computer software. A computer-readable medium may include a hardware device that is specially configured to store and execute program instructions. Some examples may include magnetic media such as hard disks, floppy disks, and magnetic tapes, optical media such as CD-ROM's and DVD's, magneto-optical media such as floptical disks, and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments, and vice versa.

While the embodiments of the invention are described above with reference to a limited number of drawings, a person having ordinary skill in the relevant field of technology would be able to derive various modifications and alterations from the disclosure provided above. A satisfactory result may be achieved, for example, by performing the procedures described above in an order different from that of a method described above and/or by coupling or combining components of the above-mentioned systems, structures, devices, circuits, etc., in a form different from that described above or replacing or substituting certain components with other components or equivalents. Therefore, other implementations, other embodiments, and equivalents of the claims set forth below are encompassed within the scope of claims.

What is claimed is:

1. A semiconductor chip comprising:
    at least one data bus configured to transmit data processed by the semiconductor chip;
    an electric potential generator block packaged together with the at least one data bus to be blocked from external light by a package, the electric potential generator block configured to detect an event in which the package is unable to block the external light; and a switch configured to block a transmission of at least some data in the at least one data bus if the event is detected, wherein the electric potential generator block comprises:
- at least one photodiode configured to generate a current when exposed to the external light;
- a capacitor configured to store an electric charge caused by at least a portion of the current; and
- a pull-down resistor configured to discharge the electric charge from the capacitor, wherein the switch is turned on to discharge at least some data from the at least one data bus to the ground and thereby block the transmission, the switch turned on by a potential difference occurring at both ends of the pull-down resistor during a discharge of the electric charge by way of the pull-down resistor.

2. The semiconductor chip of claim 1, wherein the pull-down resistor is an active element having a resistance value, the resistance value programmable by a setting.

3. The semiconductor chip of claim 2, wherein increasing a setting of the pull-down resistor decreases an amount of discharged current required for turning on the switch such that the switch is turned on relatively easily, and decreasing a setting of the pull-down resistor increases an amount of discharged current required for turning on the switch such that the switch is turned on relatively difficultly.

4. The semiconductor chip of claim 1, wherein the at least one photodiode includes a plurality of photodiodes cascaded in at least a portion thereof.

5. The semiconductor chip of claim 1, wherein the at least one photodiode includes a plurality of photodiodes connected hierarchically in a tree structure.

6. The semiconductor chip of claim 1, wherein the at least one data bus includes a plurality of data buses configured to transmit data in parallel, and the plurality of data buses share the electric potential generator block.

7. A protection device embedded in a semiconductor chip packaging, the protection device comprising:
- an electric potential generator block configured to detect an event in which the package is unable to block external light; and
- a switch configured to block at least a portion of data transmission paths within the semiconductor chip if the event is detected, wherein the electric potential generator block comprises a plurality of photodiodes connected hierarchically in a tree structure, and at least one photodiode generates a current when exposed to the external light.

8. The protection device of claim 7, wherein the electric potential generator block further comprises:
- a capacitor configured to store an electric charge caused by at least a portion of the current; and
- a pull-down resistor configured to discharge the electric charge from the capacitor.

9. The protection device of claim 8, wherein the switch is turned on to ground at least a portion of the transmission paths and thereby block the transmission paths, the switch turned on by a potential difference occurring at both ends of the pull-down resistor during a discharge of the electric charge by way of the pull-down resistor.

10. The protection device of claim 9, wherein the pull-down resistor is an active element having a resistance value, the resistance value programmable by a setting.

11. The protection device of claim 10, wherein increasing a setting of the pull-down resistor decreases an amount of discharged current required for turning on the switch such that the switch is turned on relatively easily, and decreasing a setting of the pull-down resistor increases an amount of discharged current required for turning on the switch such that the switch is turned on relatively difficultly.

* * * * *